United States Patent [19]

Vossen, Jr.

[11] 4,077,052
[45] Feb. 28, 1978

[54] VIDEO DISC CAPACITIVE RECORDING MEANS WITH A CONDUCTIVE BILAYER

[75] Inventor: John Louis Vossen, Jr., Bridgewater, N.J.

[73] Assignee: RCA Corporation, New York, N.Y.

[21] Appl. No.: 793,644

[22] Filed: May 4, 1977

[51] Int. Cl.² .................. H04N 1/28; B32B 3/02; B32B 15/08; B32B 15/20
[52] U.S. Cl. .................. 358/128; 179/100.1 B; 428/64; 428/626; 428/675
[58] Field of Search ............ 428/64, 65, 626, 675; 358/128; 179/100.1 B

[56] References Cited

U.S. PATENT DOCUMENTS

| 3,842,194 | 10/1974 | Clemens | 179/100.1 B |
|---|---|---|---|
| 3,842,217 | 10/1974 | Clemens | 179/100.1 B |
| 3,843,399 | 10/1974 | Kaplan et al. | 358/128 |
| 3,901,994 | 8/1975 | Mehalso et al. | 179/100.1 B |
| 3,909,517 | 9/1975 | Clemens | 179/100.1 B |
| 3,982,066 | 9/1976 | Nyman | 358/128 |
| 3,984,907 | 10/1976 | Vossen, Jr. et al. | 428/675 |
| 4,004,080 | 1/1977 | Vossen, Jr. et al. | 358/128 |

Primary Examiner—William J. Van Balen
Attorney, Agent, or Firm—H. Christoffersen; Birgit E. Morris; Joseph T. Harcarik

[57] ABSTRACT

This invention relates to a capacitive recording means comprising a video disc with a thin conductive bilayer on the surface of the disc wherein the bilayer is a first layer of copper and a second layer of an alloy of nickel, chromium and iron which contains oxygen. An inorganic dielectric layer is disposed on the conductive layer.

11 Claims, 1 Drawing Figure

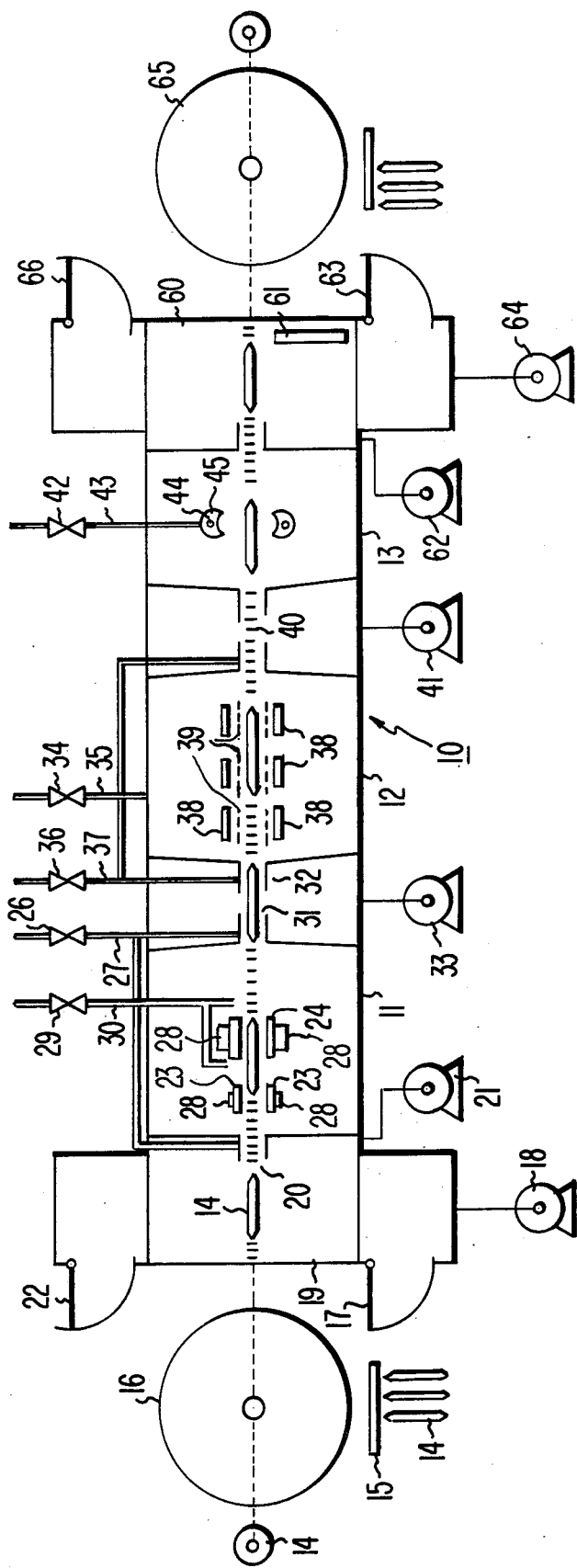

VIDEO DISC CAPACITIVE RECORDING MEANS WITH A CONDUCTIVE BILAYER

REFERENCE TO RELATED APPLICATIONS

This application is related to copending application "Method of Depositing a Silicon Oxide Dielectric Layer" by E. B. Priestley and P. J. Call, Ser. No. 794,641; copending application "A Video Disc with a Dielectric Layer Formed from Styrene and Nitrogen" by G. Kaganowicz and J. W. Robinson Ser. No. 793,872; copending application "Method of Depositing a Lubricant Layer on a Video Disc" by A. D. Grubb and G. F. Nichols Ser. No. 793,643; and copending application "A Video Disc with a Conductive Layer Having an Oxygen Content Gradient" to J. L. Vossen Ser. No. 793,640; which applications where filed concurrently with this application on May 4, 1977 and are herein incorporated by reference

BACKGROUND OF THE INVENTION

An audio/video information system for recording and playing back audio/video information has been described in U.S. Pat. Nos. 3,842,194 and 3,842,217 to Clemens, herein incorporated by reference. According to this system, audio/video information is recorded in the form of geometric variations in a spiral groove on the surface of the disc. Disc replicas are then made of an insulating material such as vinyl and are coated first with a conductive film, then with a dielectric film and finally with a lubricant layer. A metallized stylus is utilized as a second electrode forming a capacitor with the video disc. The audio/video information is monitored by the stylus which detects changes in capacitance between the stylus and the video disc as the geometric variations in the form of depressions pass under the stylus.

The dielectric layers employed are generally organic layers such as poly-p-xylylene, described in U.S. Pat. No. 3,901,994 to Mehalso et al and organic layers formed from the deposition of styrene as described in U.S. Pat. No. 3,843,399 to Kaplan et al. Conductive layers that can be utilized with the organic dielectric layers are layers such as trilayers of a copper layer, a nickel/chromium/iron alloy layer, and a third copper layer or layers of copper pseudo alloyed with a nickel/chromium/iron alloy. These conductive layers are described in U.S. Pat. No. 3,982,066 to Nyman et al and U.S. Pat. Nos. 3,984,907 and 4,004,080 to Vossen et al, which patents are herein incorporated by reference. These conductive layers form good adhesive bonds with organic dielectric layers, but when these conductive layers are employed with inorganic dielectric layers, as described in the above mentioned copending application to E. B. Priestley et al, it is found that bonding between the conductive layer and the dielectric layer could be improved. It is thus desired to have a conductive layer which will bond strongly with inorganic dielectric layers.

SUMMARY OF THE INVENTION

A capacitive recording means is comprised of a disc having a spiral groove on a face thereof with audio and video information in the form of geometric variations in the groove. Disposed on a face is a thin conductive bilayer film having a first layer of copper and a second layer of an alloy of nickel and chromium which contains up to about 10% by weight of iron. The alloy layer also contains from about 5 to 25 average atomic percent of oxygen. An inorganic dielectric film is disposed on the conductive film. It has been found that strong chemical bonds are formed between the conductive layer and the inorganic dielectric layer and that the conductive layer is corrosion resistant.

BRIEF DESCRIPTION OF THE DRAWING

The FIGURE is a schematic illustration of an apparatus for depositing first a conductive layer, then a dielectric layer, and finally a lubricant layer on a vinyl disc containing geometrically coded audio/video information.

DETAILED DESCRIPTION OF THE INVENTION

A vinyl disc containing geometrically coated audio/video information is first prepared in a manner described in the Clemens patents. A conductive bilayer is then deposited onto the vinyl disc. The bilayer is comprised of a first thin copper layer and then a nickel/chromium/iron alloy layer wherein the iron content is less than 10% by weight. Suitably, the nickel/chromium/iron alloy layer is Inconel-600 which normally contains 76.8% of nickel, 13.8% of chromium and 8.5% of iron.

The layers can be deposited by sputtering onto the vinyl disc in a vacuum chamber from metal electrodes comprised of the metal to be deposited onto the vinyl disc. In order to sputter the metal, an inert gas such as argon is introduced into the vacuum chamber which is maintained at a pressure below about 50 microns, and suitably below about 12 microns. A glow discharge in the inert gas is created by supply a current to the electrodes. Ions from the glow discharge in a planar magnetron configuration strike the metal electrodes, ejecting metal atoms. The metal atoms collect on the vinyl disc, forming metal layers. The copper layer is deposited to a thickness of approximately 25 to about 50 angstroms and the nickel/chromium/iron alloy layer is deposited to a thickness of about 100 to about 400 angstroms. In order to produce stable, stress-free films of the nickel/chromium/iron alloy, oxygen is also added to the vacuum chamber to produce an alloy film containing 5 to 25 average atomic percent of oxygen. Atomic percent employed in the specification and in the Claims is defined as that measured by Auger electron spectroscopy as described in more detail in the above mentioned U.S. Pat. No. 3,982,066. By introducing more oxygen into the alloy film as the film is deposited, peak oxygen values of 20 to 35 atomic percent will occur at the surface which will contact the dielectric layer. When the dielectric layer is a silicon oxide such as silicon dioxide, the high oxygen content at the interface will increase adhesion.

An organic dielectric layer is then deposited onto the conductive layer. Suitably, the dielectric layer is deposited utilizing a glow discharge in a vacuum chamber employing the method described in the above mentioned copending application to Priestley et al. The silicon oxide layer is deposited from a dielectric precursor having the formula

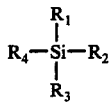

wherein $R_1$ is selected from the group consisting of H or —$CH_3$, $R_2$ and $R_3$ are independently selected from the group consisting of H, —$CH_3$, —$OCH_3$, and —$OC_2H_5$, and $R_4$ is selected from the group consisting of —$OCH_3$ and —$OC_2H_5$.

Finally, a lubricant layer such as a silicon compound lubricant is deposited on the dielectric layer as described in U.S. Pat. No. 3,833,408 to Matthies, herein incorporated by reference, or as described in the above mentioned copending application to Grubb et al.

The FIGURE is a cross-sectional top view which schematically illustrates a single apparatus for depositing the metal layers, dielectric layers and lubricant layers in a continuous manner. A vacuum chamber 10 is divided into three connecting evacuated chambers; a metal deposition chamber 11, a dielectric deposition chamber 12, and an oil lubricant deposition chamber 13. Vinyl disc replicas 14 containing geometrically coded audio/visual information are first assembled onto a rack 15 by a disc assembler 16. The disc replicas 14 are then transported into the vacuum chamber 10 via an inlet pressure lock 17. As the vinyl disc replicas 14 proceed through the inlet pressure lock 17, the pressure is reduced by means of a pump 18 to about 10 to 50 millitorr. This approximately equalizes the pressure in the inlet pressure lock 17 with the evacuated chamber 10 which is maintained at about 5 to 12 millitorr during operation. The vinyl disc replicas 14 are then transported into a loading area 19 where the vinyl discs 14 are taken from the rack 15 and loaded singly in a vertical position onto a continuously moving conveyor belt 20 which advances about 0.2 feet (6 cm) per second. The vacuum in the loading area 19 is maintained by a pump 21. The rack 15 is removed from the loading area 19 by way of an exit pressure lock 22 after pressure in the lock 22 has been equalized with the atmospheric pressure.

The vinyl discs 14 which have been loaded onto the conveyor belt 20 are conveyed into the metal deposition chamber 11 where metal layers are sputtered onto both sides of the vinyl discs 14. The coated metal layers consist of a bilayer of copper layer in contact with the vinyl disc and a nickel/chromium/iron alloy layer disposed over the copper layer. The vinyl discs 14 first passes between a pair of copper cathodes 23 which are about 4 inches (10 cm) × 15 inches (38 cm) in size and about 4 inches (10 cm) apart and then passes between a pair of nickel/chromium/iron alloy cathodes 24 which are about 14 inches (36 cm) × 29 inches (74 cm) in size and about 10 inches (25.4 cm) apart.

During sputtering a total of about 220 standard cubic centimeter per minute (sccm) of argon gas is introduced through a valve 26 and a line 27. About 130 sccm of argon gas is introduced at the inlet of chamber 11 and about 90 sccm is introduced at the chamber exit. The pressure in the metal deposition chamber 11 is maintained at about 5.5 microns. A glow discharge in the argon gas is created by supplying a current to the cathodes 23 and 24. Ions from the glow discharge are created by collisions of glow discharge electrons with neutral argon gas atoms which are confined by means of planar magnetrons 28. The ions strike the metal cathodes 23 and 24, ejecting metal atoms. The metal atoms collect on the vinyl disc 14 forming metal layers. Oxygen at a flow rate of about 20 to about 100 sccm is added through a valve 29 in a line 30 to produce an alloy layer containing 5 to 25 average atomic percent of oxygen. The oxygen is added to points on both sides of the alloy cathodes 24 as shown in the FIGURE. By introducing more oxygen at a point where the vinyl discs 14 move away from the alloy cathodes 24, peak oxygen values of 20 to 35 atomic percent in the alloy layer will occur at the surface which will contact the inorganic dielectric layer.

The vinyl discs 14 are then conveyed through a 2 inch (5 cm) wide tunnel 31 formed from metal sheets 32 into the dielectric deposition chamber 12. A low pressure is maintained in the tunnel 31 by means of a vacuum pump 33 which minimizes cross-contamination of the gases in the metal deposition chamber 11 with the gases of the dielectric deposition chamber 12.

The inorganic dielectric layer is deposited by a glow discharge. A dielectric precursor, suitably a silicon oxide precursor as described previously, is added through a valve 34 and a line 35 and oxygen is supplied through a valve 36 and a line 37. The ratio of the partial pressure of oxygen to the partial pressure of dielectric precursor in the chamber 12 should be from about 1.1. to about 10:1, with ratios of about 4:1 being preferred. The pressure in the dielectric deposition chamber is maintained at less than about 12 millitorr. A glow discharge is created by supplying an electrical current to pairs of screen electrodes 39 and the discharge is confined by magnets 38. From one to three pairs of electrodes may be employed depending upon the desired rate of deposition and layer thickness. The glow discharge activates the dielectric precursor which results in silicon oxide depositing on the surface of the discs 14. The dielectric silicon oxide layer is deposited to a thickness of from about 50 to about 250 angstroms. Current is supplied to each electrode to produce power densities from about 0.3 to 1.2 watts per centimeter$^2$. The current can be varied to regulate the thickness of the deposition film and the temperature built up on the disc, which should not exceed about 130° F (54° C). The density of the screen electrodes 39 (open area/total area) determines the amount of energy available to the dielectric precursor surrounding the vinyl discs 14, which also effects the deposition rate of the silicon oxide dielectric layer. Suitable screen densities are from about 0% to about 30%.

After the vinyl discs are coated with a silicon oxide dielectric layer they are conveyed into an oil lubricant deposition chamber 13 through a second tunnel 40. The tunnel 40 is maintained at a low pressure by means of a vacuum pump 41 to prevent cross-contamination of the gases from the dielectric deposition chamber 12 with gases of the lubricant deposition chamber 13. The lubricant oil to be deposited is added through a valve 42 and a line 43. The oil is vaporized in an oil vaporizer 44 by contacting the oil with a hot surface at about 250° C. As the oil vaporizes it diffuses from the hot surface and is directed toward the discs 14 by means of a perforated vapor distributor 45. As the oil contacts the discs 14, it condenses on the disc surfaces forming a thin uniform lubricant layer. The rate of oil vaporization, the geometry of the oil distributor 45, the pressure in the chamber 13, and the rate at which the discs 14 pass through the oil distributor 45 control the thickness of the lubricant oil layer. Suitable lubricant layer thicknesses are from about 90 to about 400 angstroms and preferably about 180 to about 230 angstroms.

The discs 14, now containing a metal layer, a dielectric layer, and a lubricant oil layer is conveyed into a disc collection area 60 where they are removed from the conveyor belt 20 and assembled onto racks 61. A vacuum in the disc collection area 60 is maintained by means of a pump 62. The racks 61 and the vinyl discs 14 then are transported through an outlet pressure lock 63 which has been evacuated by means of pump 64. The discs 14 and the racks 61 are removed from the vacuum chamber 10 after the outlet pressure lock 63 is brought to atmospheric pressure. A disc assembler 65 removes the vinyl discs 14 from the racks 61 and the racks 61 are returned to the vacuum chamber 10 by way of an inlet pressure lock 66.

The following Example is presented to further describe the invention but it is not meant to limit the invention to the details described therein.

EXAMPLE 1

In this Example vinyl disc replicas, each approximaterly 30.5 cm. in diameter and containing geometrically coded audio/video information in a spiral groove, were coated with conductive layers, dielectric layers and lubricant layers utilizing an apparatus as described in the FIGURE. The vinyl discs were coated at the rate of 720 per hour.

The deposited conductive layer was a bilayer consisting of a first copper layer about 50 angstroms thick and a second layer of an alloy of Inconel-600 (76.8% of Ni, 13.8% of Cr and 8.5% of Fe) about 200 angstroms thick. The metal deposition chamber was maintained at 6 millitorr pressure, the copper cathodes were activated each with 450 volts and 1.4 amperes of current, and the magnetrons maintained a field of 330 gauss. The Inconel electrodes were activated each with 540 volts and 17.5 amperes of current. The oxygen was introduced at a rate of about 75 sccm which produced an alloy layer containing about 18 average atomic percent oxygen with a peak oxygen content of about 25 to 30 atomic percent at the alloy layer-dielectric layer interface.

Into the dielectric deposition chamber was introduced oxygen, and methyl dimethyoxysilane HSi(OCH$_3$)$_2$CH$_3$), a dielectric precursor. The dielectric chamber was maintained at 10 millitorr pressure, with the ratio of the partial pressure of the oxygen to the dielectric precursor at 4 to 1. The screen electrodes were maintained at a power density of 1 watt per centimeter$^2$ at a frequency of 10 kilohertz. The screen density was 30%. The deposited SiO$_2$ layer was about 150 angstroms thick.

In the lubricant chamber a lubricant was added to the vaporizer at the rate of 6 ml/hr. The lubricant was a silicon compound having a viscosity of about 49.0 centistokes at 25° C and a specific gravity of 0.89 and having the formula

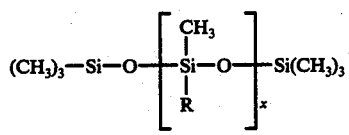

wherein R is an alkyl group of 10 carbon atoms and x is 7. The vaporizer surface was maintained at a temperature of about 235° C, and the lubricant chamber was maintained at 5 microns pressure. The deposited lubricant layer was 180 angstroms thick.

Coated video discs prepared as above were then tested for adhesion of the dielectric layer to the conductive bilayer by applying an adhesive tape to a coated video disc and then rapidly removing the adhesive tape. Inspection of the discs revealed that the dielectric layer remained bound to the conductive layer.

A vinyl disc was subjected to a more vigorous adhesion test wherein a bolt head was cemented to a video disc using cyanoacrylate cement. After the cement was allowed to set, the bolt was pulled free from the video disc. Inspection determined that the bolt separated from the cement and that the silicon oxide dielectric layer remained in contact with the conductive bilayer.

The coated video discs where further tested by repeated playbacks and it was determined these video discs performed very well after about 100 playbacks.

CONTROL

This Example is presented as a control. Video discs were prepared substantially as in Example 1 except that a trilayer of Cu/Inconel/Cu was deposited on the video discs rather than a Cu/Inconel layer. The trilayer was deposited by further passing the video discs past a pair of copper cathodes similar to those employed for depositing the first copper layer. After applying the adhesion tests described in Example 1, the silicon oxide dielectric layer adhered well enough to the conductive trilayer to withstand, in most cases, the adhesive tape test, but could not withstand the cemented bolt head test or the repeated playback test.

We claim:

1. A capacitive recording means comprising:
   a. a disc having a spiral groove on a face thereof with video information in the form of geometric variations in said groove;
   b. A thin conductive bilayer film on said face having a first layer of copper and a second layer of an alloy of nickel and chromium which contains up to about 10% by weight of iron and contains from about 5 to about 25 average atomic percent of oxygen; and
   c. an inorganic dielectric layer disposed on said conductive film.

2. A capacitive recording means according to claim 1, wherein the copper layer is about 25 to about 50 angstroms thick.

3. A capacitive recording means according to claim 1, wherein the alloy layer is about 100 to about 400 angstroms thick.

4. A capacitive recording means according to claim 1, wherein the alloy layer contains about 76.8% by weight of nickel, about 13.8% by weight of chromium, and about 8.5% by weight of iron.

5. A capacitive recording means according to claim 1, wherein the inorganic layer is about 50 to about 250 angstroms thick.

6. A capacitive recording means according to claim 1, wherein the inorganic dielectric layer is a silicon oxide.

7. A capacitive recording means according to claim 6, wherein the oxygen content in the second layer at the interface of the second layer and the silicon oxide layer is from about 20 to about 35 atomic percent.

8. A capacitive recording means according to claim 1, wherein a lubricant layer is deposed over the dielectric layer.

9. A capacitive recording means according to claim 8, wherein the lubricant layer is a silicon compound having the formula

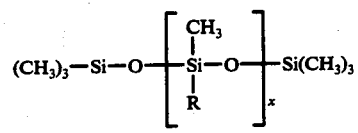

wherein R is an alkyl group of 4 – 20 carbon atoms and $x$ is an integer.

10. A capacitive recording means according to claim 8, wherein the lubricant is about 90 to about 400 angstroms thick.

11. A capacitive recording means according to claim 8, wherein the lubricant layer is about 180 to about 230 angstroms thick.

* * * * *